(12) United States Patent
DeLuca et al.

(10) Patent No.: US 10,327,272 B2
(45) Date of Patent: Jun. 18, 2019

(54) USING PERIPHERAL IOT DEVICES TO IDENTIFY PRIMARY DEVICE REPLACEMENTS

(71) Applicant: INTERNATIONAL BUSINESS MACHINES CORPORATION, Armonk, NY (US)

(72) Inventors: Lisa Seacat DeLuca, Baltimore, MD (US); Jeremy A. Greenberger, Raleigh, NC (US); Zachary M. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 15/398,863

(22) Filed: Jan. 5, 2017

(65) Prior Publication Data

US 2018/0192447 A1    Jul. 5, 2018

(51) Int. Cl.
| | | |
|---|---|---|
| *H04W 76/14* | (2018.01) | |
| *H04W 4/50* | (2018.01) | |
| *H04W 4/70* | (2018.01) | |
| *H04W 4/80* | (2018.01) | |

(52) U.S. Cl.
CPC .............. *H04W 76/14* (2018.02); *H04W 4/50* (2018.02); *H04W 4/70* (2018.02); *H04W 4/80* (2018.02)

(58) Field of Classification Search
CPC .......... H04W 4/50; H04W 4/80; H04W 76/14
See application file for complete search history.

(56) References Cited

U.S. PATENT DOCUMENTS

| | | | | |
|---|---|---|---|---|
| 8,768,306 | B1* | 7/2014 | Ben Ayed ............. | H04W 12/06 455/411 |
| 9,372,922 | B2 | 6/2016 | Shaashua et al. | |
| 9,380,613 | B2* | 6/2016 | Luna ..................... | H04W 76/10 |
| 9,602,603 | B2* | 3/2017 | Chen ....................... | H04L 67/12 |
| 2003/0114106 | A1* | 6/2003 | Miyatsu ................. | H04L 29/06 455/41.1 |
| 2008/0261526 | A1* | 10/2008 | Suresh ................... | G06Q 30/02 455/41.2 |
| 2009/0023389 | A1* | 1/2009 | Paryani ................. | H04B 1/202 455/41.2 |
| 2010/0056055 | A1* | 3/2010 | Ketari ................... | H04L 63/068 455/41.3 |

(Continued)

FOREIGN PATENT DOCUMENTS

WO      2016051237      4/2016

OTHER PUBLICATIONS

Manqele, Lindelweyizizwe et al; Preference-based Internet of Things dynamic service selection for smart campus; AFRICON; Sep. 14-17, 2015; 5 pages.

*Primary Examiner* — Jenee Holland
(74) *Attorney, Agent, or Firm* — Schmeiser, Olsen & Watts, LLP; David Wahlquist

(57) ABSTRACT

The present invention provides a method and system for updating device identification data of a user's paired mobile devices. A computing device determines that a mobile application is loaded onto the user's mobile phone which is paired with another device. When the user changes his mobile phone, a notification is enabled by the mobile application which includes changes in the paired device identifications. The notification is acknowledged by the user and stored in the computing device.

20 Claims, 8 Drawing Sheets

(56) References Cited

U.S. PATENT DOCUMENTS

| | | | |
|---|---|---|---|
| 2010/0118150 A1* | 5/2010 | Boland | H04N 5/2259 348/207.1 |
| 2011/0081860 A1* | 4/2011 | Brown | H04N 1/00347 455/41.3 |
| 2012/0209923 A1* | 8/2012 | Mathur | G06F 21/53 709/206 |
| 2013/0017816 A1* | 1/2013 | Talty | H04W 76/14 455/418 |
| 2013/0244634 A1* | 9/2013 | Garrett | G06F 9/445 455/418 |
| 2013/0317753 A1* | 11/2013 | Kamen | G06F 19/3418 702/19 |
| 2014/0038526 A1 | 2/2014 | Ennis et al. | |
| 2014/0213243 A1* | 7/2014 | Noh | H04L 12/2816 455/419 |
| 2014/0244768 A1 | 8/2014 | Shuman et al. | |
| 2014/0298353 A1* | 10/2014 | Hsu | G06F 9/54 719/313 |
| 2014/0317242 A1* | 10/2014 | Koo | H04W 12/04 709/219 |
| 2014/0342660 A1* | 11/2014 | Fullam | H04N 7/181 455/3.06 |
| 2015/0087231 A1* | 3/2015 | Sinha | H04W 76/14 455/41.2 |
| 2015/0296043 A1 | 10/2015 | Kim et al. | |
| 2015/0312346 A1* | 10/2015 | Chen | H04L 67/12 709/219 |
| 2016/0057564 A1* | 2/2016 | Sim | H04W 4/80 455/41.2 |
| 2016/0057790 A1* | 2/2016 | Sim | H04W 76/14 455/41.1 |
| 2016/0149767 A1 | 5/2016 | Britt et al. | |
| 2016/0270138 A1* | 9/2016 | Luna | H04M 1/7253 |
| 2017/0075740 A1* | 3/2017 | Breaux | G06F 9/546 |
| 2017/0156051 A1* | 6/2017 | Park | H04L 67/22 |
| 2017/0223163 A1* | 8/2017 | Li | H04M 1/7253 |
| 2017/0262668 A1* | 9/2017 | Lim | H04W 4/80 |
| 2018/0180752 A1* | 6/2018 | Gabai | G01V 1/001 |

* cited by examiner

USING PERIPHERAL IOT DEVICES TO IDENTIFY PRIMARY DEVICE REPLACEMENTS

TECHNICAL FIELD

The invention relates generally to the field of identifying wireless devices, and in particular to a method and system for using peripheral Internet of Things (IoT) devices to aid in identifying smart phones or other portable communication devices.

BACKGROUND

Bluetooth® low energy BLE beacons such as Apple iBeacons®, and Wi-Fi proximity sensors are amongst the most popular means of providing enhanced experiences for customers with smart devices attending venues, such as stadiums, airports, retail stores and hospitals. The beacons are versatile for use from sales promotions to building security. The beacons transmit a wireless signal to enabled smart devices, such as cell phones, that can notify an application on the cell phone that it is within a transmission range of a beacon at a given location. Currently there are many hardware and software solutions, such as IBM Presence Insights®, which provide aggregation of customer data to help businesses understand trends and performance of their retail locations. While this customer data is important and valuable to a business, whenever a customer purchases a new device, all history about his old device becomes useless. It would be of tremendous value to allow companies to recognize when a customer has updated his or her mobile device.

Accordingly, there is a need for improved systems and methods to efficiently and accurately update user identification and device identification data for users, for instance within venues where beacons are distributed for providing enhanced experiences for users/customers.

SUMMARY

The present invention provides a method, and associated computer system and computer program product, for identifying paired devices, by: determining, by a computing device, that a mobile application has been downloaded onto a first primary portable communication device of a user, wherein the first primary portable communication device is paired with a secondary portable communication device. The computing device communicates with the first primary portable communication device and receives an acknowledgment by the user of a notification enabled by the mobile application. The notification is received by the first primary portable communication device and shared with the secondary portable communication device. The first primary portable communication device forwards the notification and the acknowledgement to the computing device, wherein the acknowledgment includes device identifications of the paired devices. The computing device then stores the acknowledgment and device identifications into a memory and updates the device identifications of the paired devices in response to a change in paired devices.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

Figure 1:
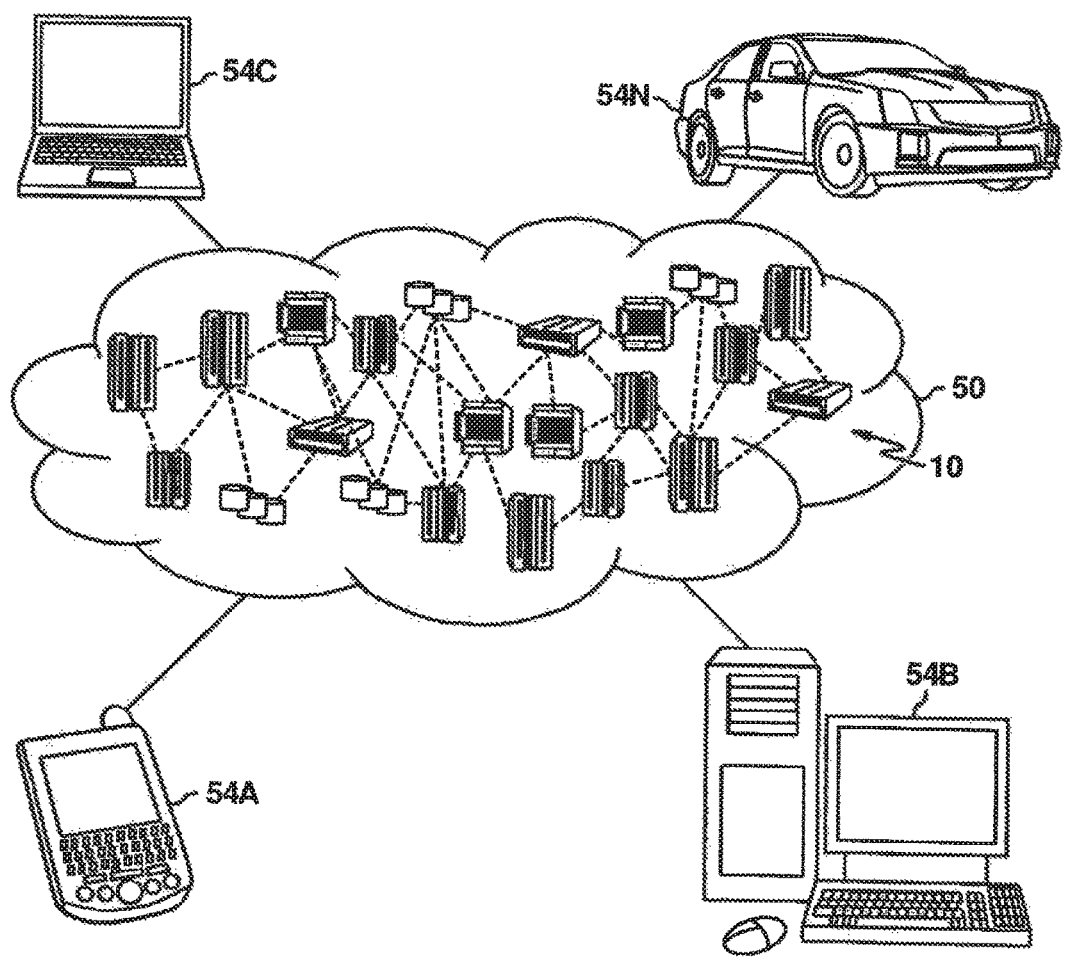
FIG. 1 depicts a cloud computing environment according to an embodiment of the present invention.

In the following description, specific details are set forth although it should be appreciated by one of ordinary skill that the present invention can be practiced without at least some of the details. In some instances, known features or processes are not described in detail so as not to obscure the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
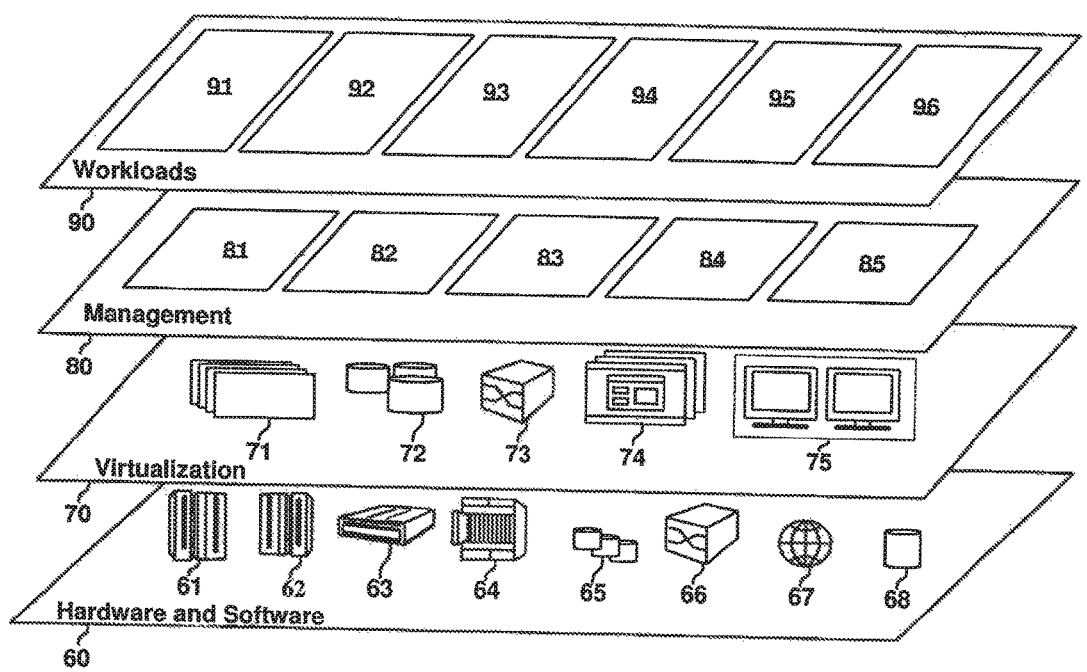
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data transfer 96 using peripheral IoT devices to identify smart phones.

Figure 3:
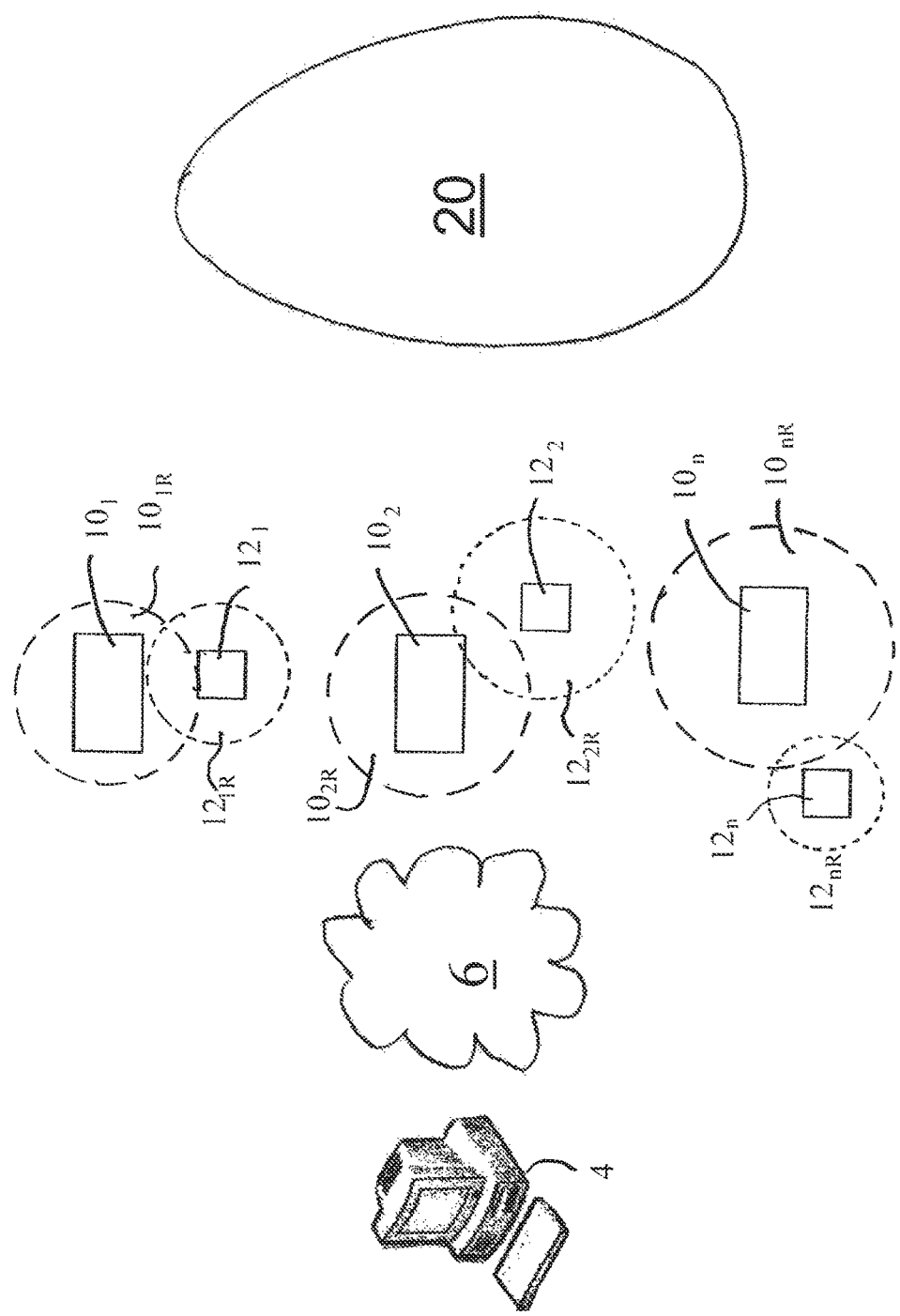
FIG. 3 is a diagram of a system for using peripheral IoT devices to identify smart phones, in accordance with embodiments of the present invention.

FIG. 3 is a diagram of a system for using peripheral IoT devices to identify smart phones, in accordance with the principles of the present invention. The system of FIG. 3 includes a computing device 4, a wireless network 6, a plurality of primary portable communication devices $10_1$, $10_2 \ldots 10_n$, a plurality of secondary portable communication devices $12_1$, $12_2 \ldots 12_n$, and a monitored region 20. Each of the plurality of primary portable communication devices $10_1$, $10_2 \ldots 10_n$ has a wireless transmission range $10_{1R}$, $10_{2R} \ldots 10_{nR}$, respectively, and each of the secondary portable communication devices $12_1$, $12_2 \ldots 12_n$, has a wireless transmission range $12_{1R}$, $12_{2R} \ldots 12_{nR}$, respectively. The transmission ranges of each of the primary portable communication devices and the secondary portable communication devices may vary or they may be the same. Also, both the primary and secondary communications devices may have wireless communications capabilities to the computing device 4, such as via the Internet, a wireless LAN network, WAN network, etc.

The wireless devices of FIG. 3 are paired so that for example: a first user would have a first primary portable communication device $10_1$ paired with a secondary portable communication device $12_1$; a second user would have a first primary portable communication device $10_2$ paired with a secondary portable communication device $12_2$; and an a $n^{th}$ user would have an $n^{th}$ primary portable communication device $10_n$ paired with a secondary portable communication device $12_n$. Each user could be a customer or client having an interest in visiting a store or other venue identified within the monitored region 20. Also, any number of wireless devices could be paired together.

The computing device 4, used to implement the methods of the present invention, can be any known computer device which is connected to a wireless network, preferably the Internet. For instance, the computing device 4 could be a desktop computer, server, laptop computer, computer tablet, smart phone, mobile computer or any other wireless computerized device.

In the system of FIG. 3, the computing device 4 communicates with the primary portable communication devices $10_1$, $10_2 \ldots 10_n$ over a first wireless network 6 by way of a first wireless network of wireless communication via Wi-Fi, the Internet, a wireless LAN (local area network), a wireless WAN wireless transmission, or the like to a multitude or plurality of portable communication devices 22 (see FIG. 4); e.g., using cloud technology, which is well known as the practice of using a network of remote servers/computers hosted on the Internet to store, manage, and process data, rather than by using a hard-wired local server or a personal computer. The first wireless network 6 or cloud is used to transfer data between the computing device 4 and the plurality of primary portable communication devices $10_1$, $10_2 \ldots 10_n$.

In the system of FIG. 3, each primary portable communication device $10_1$, $10_n$, is paired, respectively, with an associated secondary portable communication devices $12_1$, $12_2 \ldots 12_n$, both being owned and possessed by the same user. The wireless communications between the paired devices is implemented by protocols such as Wi-Fi 802.11 networks and Bluetooth® BLE beacons.

Figure 4:
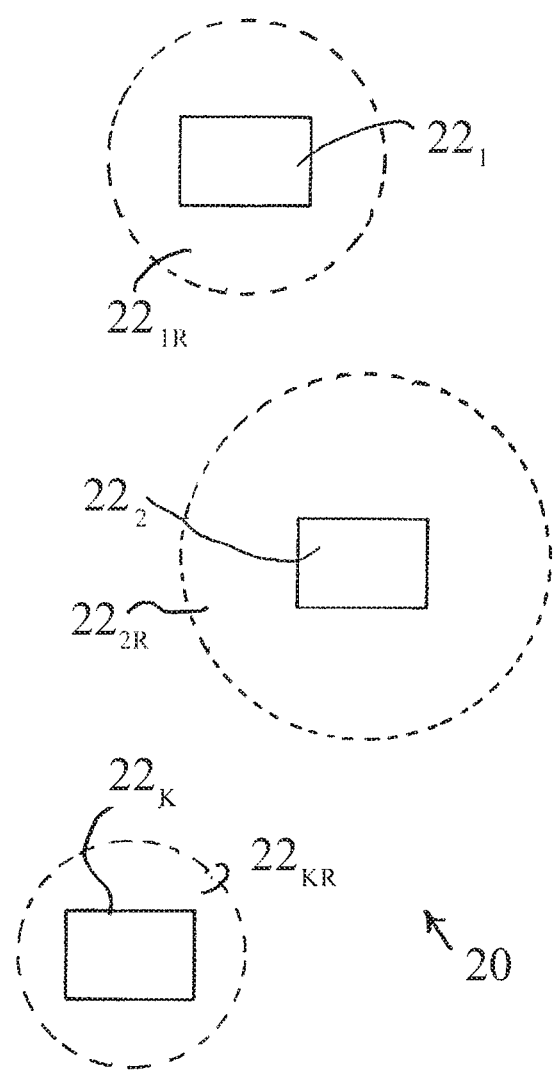
FIG. 4 is a diagram of a monitored region of a wireless network, in accordance with embodiments of the present invention.

FIG. 4 is a diagram of the monitored region 20 of FIG. 3, in accordance with embodiments of the present invention. The monitored region includes a plurality of beacons $22_1$, $22_2 \ldots 22_k$ wherein each beacon 22 has a separate transmission region $22_{1R}$, $22_{2R} \ldots 22_{kR}$, respectively. The transmission range for each beacon, such as $22_{1R}$ related to beacon $22_1$, typically would closely resemble a circle centered at beacon $22_1$ having a given radius of transmission. The beacons $22_1$, $22_2 \ldots 22_k$ use micro-location technologies, such as Bluetooth Low Energy (BLE) beacons which are becoming increasingly important to commercial venues such as retail stores, hospitals and sporting venues.

The monitored region 20 is an area of a second wireless network where an accumulation of e.g. Bluetooth communications in a venue is distinct and separate from the previously described first wireless network (e.g. Internet). For instance the second wireless network can be (1) Bluetooth communications from one or more Bluetooth beacons dispersed throughout a store or venue, (2) a Wi-Fi or LAN network wirelessly accessible by wireless devices within a limited range, or (3) a geo-fence whereby geo-fencing is defined as the practice of using global positioning (GPS) or radio frequency identification (RFID) to define a geographic boundary. Once a geo-fence or "virtual barrier" is established, an administrator can set up triggers that send a text message, email alert, or mobile app notification when a mobile device enters or exits the specified area within the geo-fence.

Various wireless beacons are available on the market, such as Apple Inc.'s iBeacon® and Google Inc.'s Eddystone®, as well as others. Management of large beacon deployments in venues is very difficult since BLE beacons do not connect to a Wi-Fi network, being so-called "dummy devices" which require a device interaction to configure the settings of each individual beacon. As one example, iBeacons are a class of Bluetooth® low energy devices that broadcast their location to nearby portable electronic devices, using a protocol standardized by Apple. The technology enables smartphones, tablets and other portable communication devices to perform actions when within range of a signal transmission from an iBeacon.

Bluetooth® technology, trademarked by Bluetooth Special Interest Groups (SIG), Inc., is a wireless technology standard for exchanging data over short distances using short-wavelength UHF radio waves in the frequency range of 2.4 to 2.485 GHz from fixed and mobile devices. Bluetooth technology is designed primarily for low-power consumption with a short range based on low-cost transceiver microchips in each device to facilitate audio and data distribution and wireless interconnection of mobile phones, computers, and other electronic devices. Bluetooth protocol is known in the art as a short range, e.g. 10 meter, frequency-hopping radio link between devices. Bluetooth enabled devices recognize other Bluetooth devices that are within range and then connect with those other Bluetooth devices, either automatically or at a user's discretion.

In FIG. 4 the plurality of BLE beacons $22_1$, $22_2 \ldots 22_k$ of FIG. 2 together form the monitored region 20 of FIG. 3. For instance, these beacons may be placed in locations throughout a retail store or other venue where user engagement would most likely be triggered. In contrast to other sensing hardware, beacons operate on small batteries (such as watch batteries) and thus beacons do not have a dependency on electrical power outlets. The beacons can be stuck to any location (e.g. with double sided tape), although there should be an awareness to potential obstructions since the beacon is sending out a radio signal which could potentially be blocked or reflected. Most beacons send their signals in all directions, but some vendors provide beacons with directional control.

Each BLE beacon 22 includes a Micro-Controller Unit (MCU), a BLE radio transmitter and receiver, an antenna and a power source. The BLE beacon broadcasts a signal throughout a given range, where the signal includes packets with identifying information, and each packet is called an Advertising Packet (AP). The APs generally include product information, pricing information, etc. which a client or customer may find useful while browsing through, for instance, a retail store where the beacons are located. The packet structure and the information broadcast by a beacon depend on the specific beacon protocol and the packets typically include fields of beacon configuration data.

A beacon 22 typically includes the following configuration parameters: UUID (universal unique identifier), a MAJOR and a MINOR. An UUID is a unique identifier which is used to individually identify a beacon or a group of beacons from other beacons. A Major is a number which is used to identify a group of beacons that share a UUID. In other words, a Major defines a property of the beacon signal to distinguish between different zones within a venue. A Minor is a number which is used to identify a specific beacon that shares both a UUID and a Major number. A Minor also defines a property of the beacon signal in order to further distinguish or sub-divide zones within a venue.

Identified data that is specific to each beacon 22 is referred to as beacon configuration data. The identified data includes parameters such as, but not limited to, the UUID number, a Major number, a Minor number, radio range of the beacon, beacon radio signal frequency information, Received Signal Strength Indicator (RSSI), beacon battery life information, information identifying the exact location of the beacon, time intervals between beacon transmissions, beacon power information, beacon date put into use, etc.

In the system of FIG. 3, the computing device 4 communicates by way of wireless communication via Wi-Fi, the Internet, a wireless LAN (local area network), a wireless WAN wireless transmission, or the like to a multitude or plurality of portable communication devices 22; e.g., using cloud technology, which is well known as the practice of using a network of remote servers/computers hosted on the Internet to store, manage, and process data, rather than by using a hard-wired local server or a personal computer. A first wireless network 6 or cloud is used to transfer data between the computing device 4 and the plurality of primary portable communication devices $10_1$, $10_2$ . . . $10_n$. The plurality of primary portable communication devices $10_1$, $10_2$ . . . $10_n$ are physically in the possession of users, customers or others who move throughout a venue such as a retail store where beacons $22_1$, $22_2$ . . . $22_k$ are located. Each customer also physically possesses a secondary portable communication device $12_1$, $12_2$ . . . $12_n$, which is paired to his or her corresponding primary portable communication devices $10_1$, $10_2$ . . . $10_n$, respectively. The terminology of "pairing devices" refers to creating a distinctive wireless communications capability between the two devices, typically using Bluetooth technology.

The user/customer owns a smart phone deemed as a first primary portable communication device, as well as one or more secondary portable communication devices which have been paired together with the first primary portable communication device and with one another. The first primary portable communication device can be any smart device, such as a smart phone, a tablet, laptop, etc., which communications wirelessly over the first wireless network, i.e. the Internet. The secondary portable communication device is any wireless computerized device that is paired with the first primary portable communication device, and which also communicates with beacons within the monitored region 20. For instance, the secondary portable communication device could be a peripheral IoT device such as a smart watch, a smart wristband, smart glasses, a selfie remote, a shopping button, smart armband, an activity sensor, a Bluetooth bike lock, a wireless headset, smart ring or any type of wireless electronic sensor.

Figure 5:
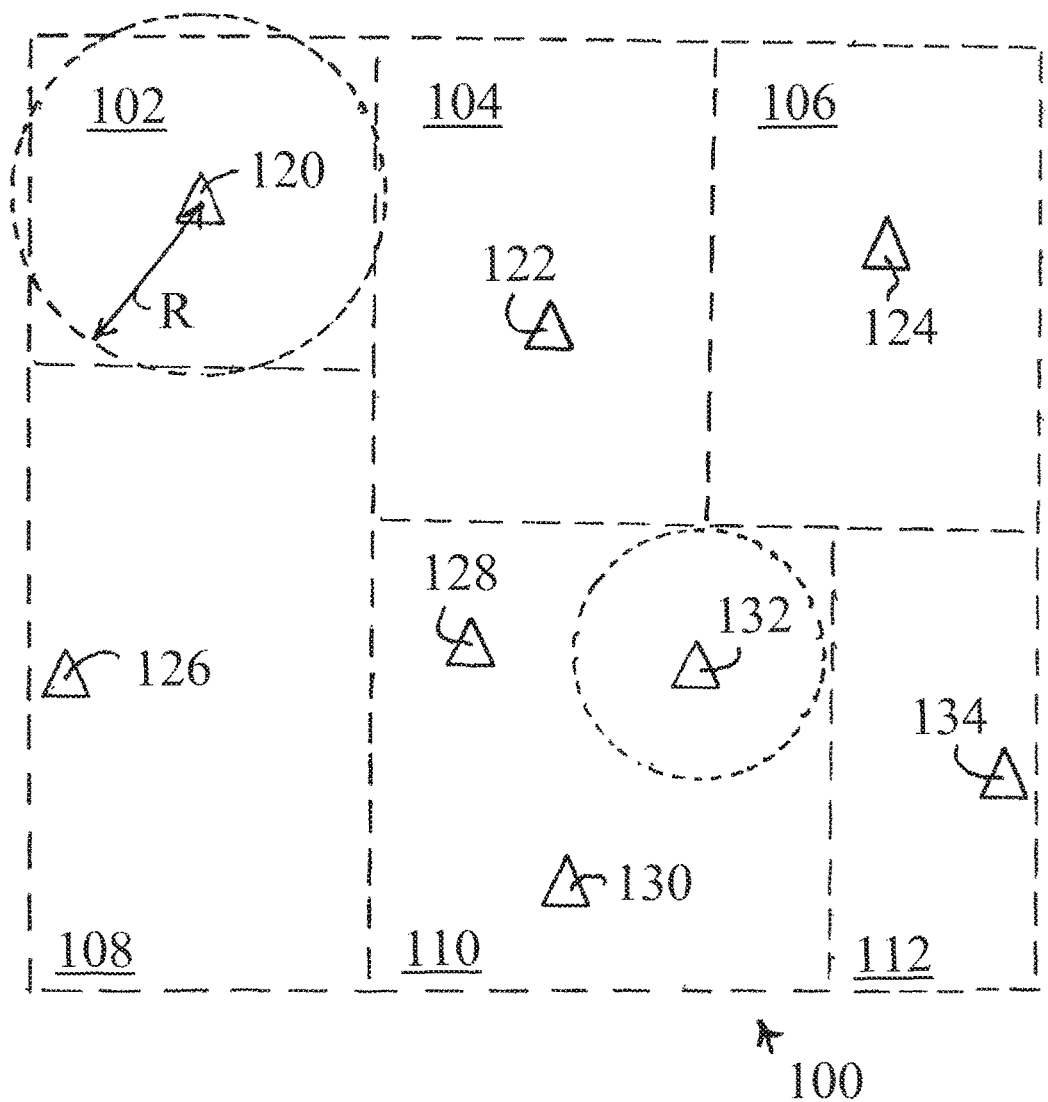
FIG. 5 is an exemplary floor plan of a retail store using beacon technology and illustrating the implementation of an embodiment of the inventive method for using peripheral IoT devices to identify smart phones, in accordance with embodiments of the present invention.

FIG. 5 is an exemplary floor plan of a retail store using beacon technology and illustrating the implementation of an embodiment of the inventive method for using peripheral IoT devices to identify smart phones, in accordance with embodiments of the present invention. The exemplary floor plan of the retail store 100 illustrates the beacon technology used within the store system.

Store 100 is a retail grocery store having an open floor plan where all departments and areas are located in one large room separated only by aisles and shelves of products. The store 100 has a frozen foods area 102, a canned goods are 104, a dairy area 106, an area 108 for cleaning items, a produce area 110 having fresh fruits and vegetables, and a bakery area 112. A beacon integration system has been installed in the store to provide customers with information about products, sales, special events, etc. as the customers walk throughout the store.

One such commercially available beacon integration system is IBM® Presence Insights® which consists of hardware and software systems, and is available as a Cloud Service. The system provides a platform that enables venues (such as store 100) associated with public spaces, healthcare, travel, stadiums, retail stores, and transportation businesses to extend customer service and support with any type of computerized wireless customer mobile devices such as smart phones, tablets, portable computers, etc. Although Presence Insights is used for the embodiments herein, other beacon integration systems could also be used.

The beacon integration system platform leverages inputs from multiple sources of sensory technology, combining them to determine accurate locations for devices within the venue. The store beacons include beacon sensors which provide beacon location information. The beacons are intentionally conspicuous devices designed to attract attention to specific locations. The goal of beacon use in the store 100 is to track user movements and locations, and to alert the user by triggering actions in the application of the mobile user device.

The beacon integration system of store 100 is used to detect and gather real-time information about mobile devices, such as the primary portable communication devices $10_1$, $10_2$ . . . $10_n$ shown in FIG. 3. This information is used to monitor presence and track movement of mobile devices in a defined space or region. A software application, i.e. a "mobile app", is loaded onto a customer's smart phone, tablet or other portable computing devices that have wireless capability. Based on the detection of a mobile user device (i.e. the user's secondary portable communication device) in proximity to a beacon, business logic can trigger a notification to the user. That notification can be a push notification, sms (short message service text), mms (multi-media messaging service), etc. and it can involve anything from a simple message to a coupon.

The beacon integration system platform supports various sensing technologies associated with radio communication protocols, such as Wi-Fi 802.11 networks and Bluetooth BLE beacons. An in-store customer experience will use intelligent location-based technology for marketing promotions and to engage customers/patrons using mobile devices in near real-time to influence and increase sales.

Both Wi-Fi proximity sensors that provide basic mobile device detection, and Bluetooth devices are supported by the exemplary beacon integration system which could support networks of Wi-Fi access points, referred to as Location Service Provider (LSP) systems, Bluetooth open standard protocols, or various proprietary beacon protocol networks.

The beacon integration system can also provide data for businesses to adjust associate and staff coverage based upon patron traffic. Mobile user devices, i.e. portable communication devices, communicate through radio signals using various protocols such as Bluetooth BLE, Wi-Fi 802.11 2.4 GHz and 5 GHz, and other radio communication protocols. When a mobile user device is detected using one of the supported protocols, a Globally Unique Identifier (GUID) is assigned for the device whereby the GUID can be the MAC address for the device.

Depending on the selected sensor hardware, there are two potential architectures of a beacon integration system for deployment within a venue: "Independent sensor system" architectures and "Location Service Provider (LSP)" architectures. Different sensors, whether beacons or Wi-Fi, fall into one or both categories. The quality of the device location data differs when received from a Location Service Provider versus information received from an Independent Sensor System. Location service providers use filtering, noise reduction algorithms, and triangulation or trilateration algorithms that convert radio signal values with a Received Signal Strength Indicator (RSSI) into relative coordinates. The RSSI defines the strength of a detected beacon signal. Trilateration is a known technique used in surveying and mapmaking that uses a tellurometer for measuring the sides of a network of triangles. Triangulation is also a known technique for the tracing and measurement of a series or network of triangles in order to determine the distances and relative positions of points spread over a territory or region, especially by measuring the length of one side of each triangle and deducing its angles and the length of the other two sides by observation from this baseline.

In an Independent Sensor System (ISS) architecture the sensors, which are usually beacons, simply broadcast their signals and require the beacon integration system SDK on a mobile application to listen for these signals and report them to the beacon integration system server. There is no third party aggregation server involved, so the location coordinates of a mobile device are usually assumed to be the location coordinates of the sensor that detected it. Fine-grained location determination is currently not possible with a single independent sensor due to hardware limitations. Some sensor payloads may contain accuracy attributes, but these types of metrics should be used very carefully because of the inherent inaccuracies in location hardware systems.

ISS architectures were previously referred to as "open architecture" systems. However, the phrase "open architecture" more accurately refers to any sensor system that uses open standards and protocols, such as the iBeacon protocol, supported by the beacon integration system SDK to send location data directly to the beacon integration system connectors. The term "closed architecture" generally refers to a system that uses proprietary communication protocols, a vendor-specific SDK, and some type of control or aggregation server. Frequently a "closed architecture" system can provide specific location coordinates while taking advantage of internal algorithms associated with the aggregation of location data form multiple sensors.

In a Location Service Provider System (LSPS) architecture, there is a separate control server involved in the sensor deployment, as well as a separate vendor-specific mobile SDK. The mobile application uses the vendor-specific SDK to send beacon data to a control server. This control server aggregates the data and can manipulate the data in a variety of ways, such as smoothing and filtering the data, and possibly employing triangulation or trilateration algorithms to determine relative device coordinates based on radio signal direction and strength. This control server must be configured to then send the data to the beacon integration system server. The data format may be completely different at that point. For example, the control server may be able to determine the exact position of the detected device and send the X,Y coordinates to the beacon integration system.

Location service provider architectures have also been referred to as "closed systems" that typically use proprietary communication protocols along with a third party SDK. These closed systems can resolve a mobile user device location to specific X,Y coordinates on a map, which allows for finer grained location-based actions and analytics.

A user, via both his primary portable communication device and his and secondary portable communication device, is tracked as he or she moves through the venue and all personally identifiable information (PII) including the MAC address or GUID is encrypted by using a public key that is provided by the vendor to ensure that the user/customer data is secure. As the mobile user device moves through the venue, notifications can be triggered and sent to enable other back-office systems to take action.

In FIG. 5 beacons 120, 122, 124, 126, 128, 130, 132, 134 have been positioned throughout the store 100, whereby each beacon transmits a Bluetooth signal having a predetermined range in such as manner as to provide complete coverage of the retail shopping areas. Other types of short range wireless transmission to and from a beacon could be used, although this example uses Bluetooth.

Beacon 120 is shown to have a transmission radius R which is predetermined according the manufacturer's specifications for the particular beacon. For instance the maximum radius could be 10.0 meters. The beacon 120 is positioned in the frozen food area 102 in a location where all products and floor space within the frozen food area 102 will be within the range or radius R of the beacon 120.

Beacon 122 is positioned within the canned goods area 104, beacon 124 is positioned within the dairy area 106, beacon 126 is positioned within the cleaning goods area 108, beacons 128, 130 and 132 are positioned within the fresh produce area 110, and the beacon 134 is positioned within the bakery area 112. Of course, more or less beacons could be positioned and activated throughout the store 100 if desired. The fresh produce area 110 includes a beacon 128 in the fresh fruit section, a beacon 130 in the fresh vegetable section, and a beacon 132 in the organic fruit and vegetable section.

Figure 6A:
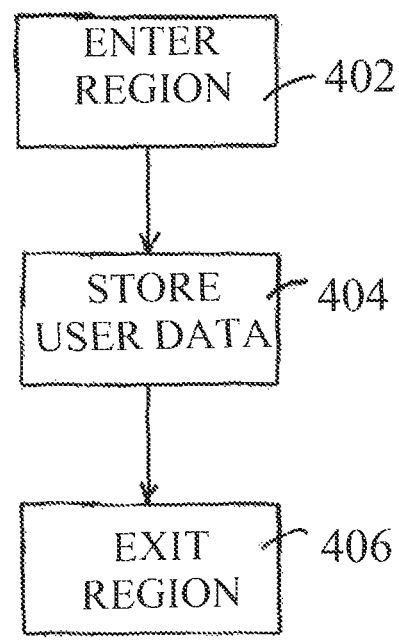
FIG. 6A is a flow chart diagram of initialization steps of a method for using peripheral IoT devices to identify smart phones, in accordance with embodiments of the present invention.
Figure 6B:
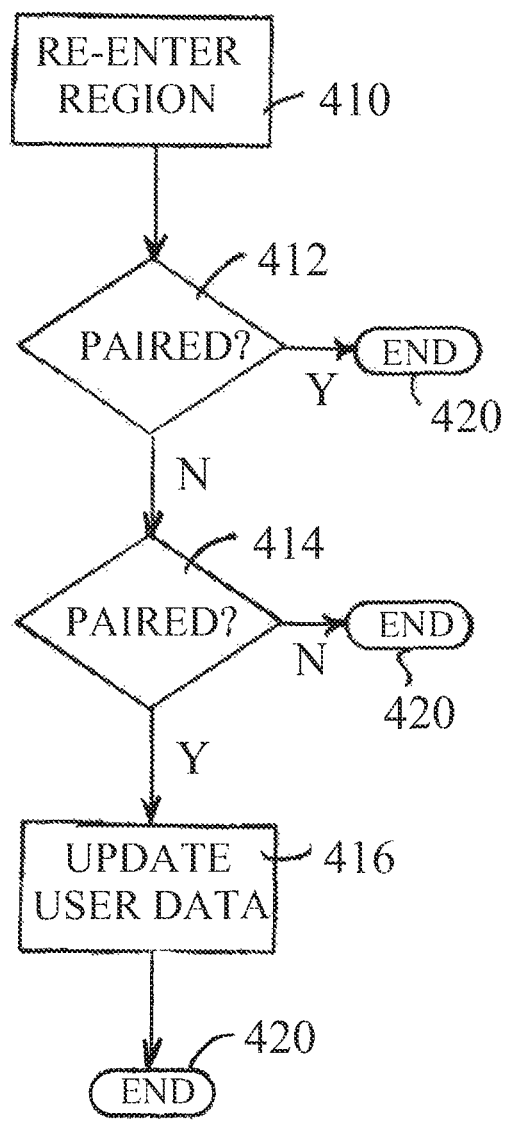
FIG. 6B is a flow chart diagram of a method for using peripheral IoT devices to identify smart phones, in accordance with embodiments of the present invention.

FIG. 6A is a flow chart diagram of initialization steps of the method of FIG. 6B for using peripheral IoT devices to identify smart phones, in accordance with embodiments of the present invention. FIGS. 6A and 6B will be described with reference to the system of FIG. 3.

In step 402, an user having a first primary portable communication device $10_1$ and a paired secondary portable communication device $12_1$ enters the monitored region 20 of FIG. 3 for the first time. In this example the monitored region 20 is a retail store having numerous Bluetooth beacons distributed throughout for transferring data to the user (via a second wireless network) as he walks through the store, i.e. the monitored region. The first primary portable communication device is an Apple® iPhone® smart phone which is paired with an Apple iWatch® being the secondary portable communication device. Each device has unique device identification data. As the user walks throughout the store monitored area 20, the Bluetooth beacons in the store communicate with both the iPhone5s first primary portable communication device 10₁ and the iWatch paired secondary portable communication device 12₁ over the second wireless network 20 as the respective device comes within range of each beacon. The iPhone5s 10₁ also communicates with the computing device 4 via the Internet (i.e. a first communications network 6).

The computing device 4 in step 404 receives and stores within a memory, user identification data via the first wireless network 6 which includes device identification data to uniquely identify each device (the iPhone5s 10₁ and the iWatch 12₁), and data indicating that the two specific devices are paired together. At some point in time the user and his paired devices 10₁ and 12₁ will exit the monitored region 20 as designated in step 406.

User identification data is defined as any and all data that is related to a specific user as identified by his or her portable communication devices. User identification data can include device identification data of specific devices linked to the user, such as a peripheral IoT device like a smart watch, a smart wristband, smart glasses, a selfie remote, a shopping button, smart armband, an activity sensor, a Bluetooth bike lock, a wireless headset, smart ring or any type of wireless electronic sensor. The user identification data can also include any data related to the user such as, but not limited to, marketing data, purchasing data, personal data, shopping habit data, etc. which could be accumulated over a period of time.

Once the initialization steps 402, 404, 406 of FIG. 6A have been completed, then the user identification data and the device identifications for the paired devices 10₁ and 12₁ will be stored in memory. The user identification data of the specific user stored on the computing device 4 includes data of the user's interests, marketing data, store visit data, etc.

Turning to step 410 of FIG. 6B, the same user of originally paired devices 10₁ and 12₁ re-enters the monitored region 20 only this time he no longer has his original iPhone5s 10₁ which the user has upgraded and replaced with a different device, a smart phone iPhone 6s. The new iPhone 6s has been paired together by the user with the user's original iWatch 12₁ so that the two devices communicate with one another. Upon re-entry into the monitored region, i.e. a retail store, the computing device 4 will prompt the user to download the store mobile app onto the iPhone 6s.

In this example the original iPhone5s 10₁ is designated as the first primary portable communication device; the original iWatch 12₁ is designated as the secondary portable communication device; and the new iPhone 6s is designated as the second primary portable communication device to replace the iPhone 5s.

As the user walks around the store and comes within transmission range of beacons, the beacons will communicate with both the iPhone 6s and the iWatch. The user identification data and device identification data of the iWatch will be transferred back to the computing device 4 via the iPhone 6s and the computing device 4 will link all of the user's records of previous visits to the store by way of identification of the iWatch including the fact that the user had two originally paired devices, the iPhone 5s and the iWatch. In step 412, once the computing device 4 has received the user identification data that the user and his iWatch are present in the store, the computing device 4 will determine whether the user is also carrying the originally paired iPhone 5s. If the answer of step 412 is Yes, then the process ends in step 420. If the answer is No, then the process continues to step 414.

The computing device 4 determines in step 414 whether the second primary portable communication device, the iPhone 6s, is paired with the iWatch (the secondary portable communication device). If it is not, then the process ends in step 420. However if the iPhone 6s and the iWatch are determined by the computing device 4 to be paired devices in step 416, then the user identification data is updated in step 416 so that the computing device 4 recognizes and stores that the iPhone 6s and the iWatch are now paired.

In this example, all of the user identification data and device identification data for a user that is stored in the computing device 4 with regards to the originally paired devices (the iPhone 5s and the iWatch) is now made available to the store (e.g. by computing device 4) and to the user/customer via his newly paired devices, i.e. the iPhone 6s and the iWatch. Moreover the mobile app can prompt the user whether the first primary portable communication device iPhone 5s should be deleted from the store's records altogether, such as in the case that the iPhone 5s is no longer in service. Alternately, the user identification data could be retained to identify both (1) the original pairing of the iPhone 5s and the iWatch, and (2) the second pairing of the iPhone 6s and the iWatch whereby the same user identification records stored in the computing device 4 would be accessible and updated with regards to either pairing of devices. In other words, identical user identification data could be stored for either pairing if desired.

In another alternative, the computing device 4 could automatically delete any given user device, such as the iPhone 5s, if the device is not present and recognized in the monitored area 20 of the store within a predetermined period of time, e.g. for one year.

The inventive method is implemented on the computing device which determines that a mobile application has been downloaded onto a first primary portable communication device of a user. The first primary portable communication device and the secondary portable communication device are paired devices, and the computing device communicates with the first primary portable communication device via the Internet.

When the user receives an alert on his smart phone or other paired mobile device via a notification enabled by the mobile application, such as a notification, email or text message, he will acknowledge the notification, for instance by selecting an icon or providing a verbal acknowledgment if audio capability is present. The notification could be a pop-up message and could be signaled, for instance by an audio tone on the user's device. The acknowledgment communication could occur between the user and any of his devices which has Internet or similar communications capability. The computing device receives the acknowledgement by the user of the notification which includes device identifications of all of the user's paired devices which have been sharing data with one another. The notification is received by the first primary portable communication device and shared with the secondary portable communication device and the first primary portable communication device forwards the notification and the acknowledgement to the computing device. Notably, the acknowledgment includes device identifications of each of the paired devices which are stored into a memory of the computing device. If the user's paired devices have changed, then the computing device will store the updated changed device identifications.

Figure 7:
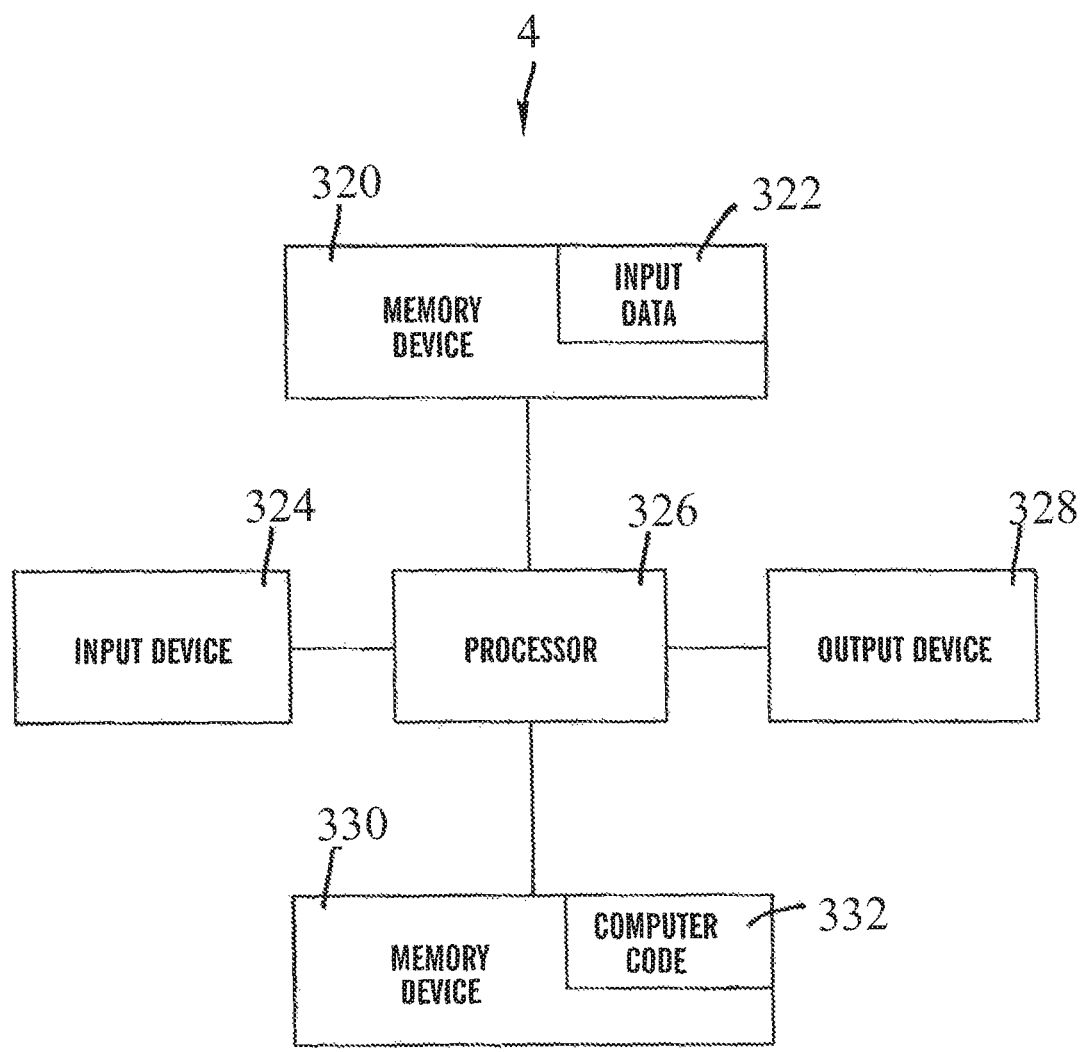
FIG. 7 illustrates an embodiment of the computing device of FIG. 3 used for implementing the methods of the present invention.

FIG. 7 illustrates an embodiment of the computing device 4 of FIG. 3 used for implementing the methods of the present invention. The computing device 4 includes a processor 326, an input device 324 coupled to the processor 326, an output device 328 coupled to the processor 326, and memory devices 320 and 330 each coupled to the processor 326. The input device 324 may be, inter alia, a keyboard, a mouse, etc. The output device 328 may be, inter alia, a printer, a plotter, a computer screen, a magnetic tape, a removable hard disk, a floppy disk, etc. The memory devices 320 and 330 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 330 includes a computer code 332 which is a computer program that includes computer-executable instructions. The computer code 332 includes software or program instructions that may implement an algorithm for implementing methods of the present invention. The processor 326 executes the computer code 332. The memory device 320 includes input data 322. The input data 322 includes input required by the computer code 332. The output device 328 displays output from the computer code 332. Either or both memory devices 320 and 330 (or one or more additional memory devices not shown) may be used as a computer usable storage medium (or program storage device) having a computer readable program embodied therein and/or having other data stored therein, wherein the computer readable program includes the computer code 332. Generally, a computer program product (or, alternatively, an article of manufacture) of the computer system/device 4 may include the computer usable storage medium (or said program storage device). The processor 326 may represent one or more processors. The memory device 320 and/or the memory device 330 may represent one or more computer readable hardware storage devices and/or one or more memories.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks/steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or step in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying paired devices, said method comprising:
    determining, by a computing device, that a mobile application has been downloaded onto a first primary portable communication device of a user, wherein said first primary portable communication device is paired to a secondary portable communication device;
    receiving, by the computing device, an acknowledgment by the user of a notification enabled by the mobile application, the notification being received by the first primary portable communication device and shared with the secondary portable communication device, wherein the acknowledgment includes device identifications of the paired devices;
    storing, by the computing device into a memory of the computing device and in response to the acknowledgment, the device identifications of the paired devices; and
    updating, by the computing device, device identifications of the paired devices in response to a change in paired devices.

2. The method of claim 1, wherein the change in paired devices comprises a second primary portable communication device being paired with the secondary portable communication device.

3. The method of claim 1, wherein the change in paired devices comprises the secondary portable communication device no longer being paired with the first primary portable communication device.

4. The method of claim 1, wherein the mobile application corresponds to a venue.

5. The method of claim 1, wherein devices are paired via Bluetooth technology.

6. The method of claim 1, wherein said computing device communicates with said primary communication device via the Internet.

7. The method of claim 1, wherein the step of updating device identifications occurs after a predetermined period of time.

8. A computer program product, comprising one or more computer readable hardware storage devices having computer readable program code stored therein, said program code containing instructions executable by a computing device to implement a method of identifying paired devices, said method comprising:
    determining, by a computing device, that a mobile application has been downloaded onto a first primary portable communication device of a user, wherein said first primary portable communication device is paired to a secondary portable communication device;
    receiving, by the computing device, an acknowledgment by the user of a notification enabled by the mobile application, the notification being received by the first primary portable communication device and shared with the secondary portable communication device, wherein the acknowledgment includes device identifications of the paired devices;
    storing, by the computing device into a memory of the computing device and in response to the acknowledgment, the device identifications of the paired devices; and
    updating, by the computing device, device identifications of the paired devices in response to a change in paired devices.

9. The computer program product of claim 8, wherein the change in paired devices comprises a second primary portable communication device being paired with the secondary portable communication device.

10. The computer program product of claim 1, wherein the change in paired devices comprises the secondary portable communication device no longer being paired with the first primary portable communication device.

11. The computer program product of claim 1, wherein the mobile application corresponds to a venue.

12. The computer program product of claim 1, wherein devices are paired via Bluetooth technology.

13. The computer program product of claim 1, wherein said computing device communicates with said primary communication device via the Internet.

14. The computer program product of claim 1, wherein the step of updating device identifications occurs after a predetermined period of time.

15. A system, comprising: a computing device, said computing device comprising one or more processors, one or more memories, and one or more computer readable hardware storage devices, said one or more hardware storage devices containing program code executable by the one or more processors via the one or more memories to implement a method of identifying paired devices, said method comprising:
- determining, by a computing device, that a mobile application has been downloaded onto a first primary portable communication device of a user, wherein said first primary portable communication device is paired to a secondary portable communication device;
- receiving, by the computing device, an acknowledgment by the user of a notification enabled by the mobile application, the notification being received by the first primary portable communication device and shared with the secondary portable communication device, wherein the acknowledgment includes device identifications of the paired devices;
- storing, by the computing device into a memory of the computing device and in response to the acknowledgment, the device identifications of the paired devices; and
- updating, by the computing device, device identifications of the paired devices in response to a change in paired devices.

16. The system of claim 15, wherein the change in paired devices comprises a second primary portable communication device being paired with the secondary portable communication device.

17. The system of claim 15, wherein the change in paired devices comprises the secondary portable communication device no longer being paired with the first primary portable communication device.

18. The system of claim 15, wherein the mobile application corresponds to a venue.

19. The system of claim 15, wherein devices are paired via Bluetooth technology.

20. The system of claim 15, wherein said computing device communicates with said primary communication device via the Internet.

* * * * *